United States Patent [19]

Grunwald

[11] Patent Number: 5,054,819
[45] Date of Patent: Oct. 8, 1991

[54] PLUMBING ELBOWS OR BENDS

[75] Inventor: Donald R. Grunwald, Bethlehem, Pa.

[73] Assignee: Victaulic Company of America, Easton, Pa.

[21] Appl. No.: 481,876

[22] Filed: Feb. 16, 1990

[51] Int. Cl.$^5$ .............................................. F16L 43/00
[52] U.S. Cl. ..................................... 285/179; 285/157
[58] Field of Search ......................... 285/176, 179, 157

[56] References Cited

U.S. PATENT DOCUMENTS

| 298,059 | 5/1884 | Bennett | 285/179 X |
| 1,215,451 | 2/1917 | White | 285/176 X |
| 1,984,172 | 12/1934 | Brownley | 285/179 |
| 2,303,949 | 12/1942 | Nordell | 285/179 X |

FOREIGN PATENT DOCUMENTS

| 168922 | 3/1906 | Fed. Rep. of Germany | 285/179 |
| 601256 | 8/1934 | Fed. Rep. of Germany | 285/179 |
| 13962 | of 1894 | United Kingdom | 285/179 |
| 184082 | 8/1922 | United Kingdom | 285/179 |

Primary Examiner—Dave W. Arola
Attorney, Agent, or Firm—Abelman Frayne & Schwab

[57] ABSTRACT

A plumbling fitting in the form of an elbow or bend is formed of standard radius at the extrados in order to provide a fitting of minimal size, and, is expanded outwardly intermediate its ends at positions other than at the extrados, in order to increase the internal cross-sectional area of the elbow or bend intermediate the ends thereof and minimize pressure losses in the elbow or bend. A major portion of the cross sectional area is located in the vicinity of the extrados, thus positioning the centroid of that area and the longitudinal axis of the elbow or bend at a location displaced towards the extrados and displaced radially outwardly along the radius of the extrados, thus providing a reduced pressure loss comparable to an elbow or fitting of larger size.

13 Claims, 5 Drawing Sheets

PLUMBING ELBOWS OR BENDS

FIELD OF THE INVENTION

This invention relates to plumbing fittings for hydraulic piping systems, and in particular to elbows or bends for use in such an environment.

The invention has particular application in plumbing fittings formed from metal by a casting process. It also has application in plumbing fittings formed in other manners, for example, by blow-molding, forging, hydroforming and the like.

The plumbing fittings of the present invention find particular utility in fire fighting and fire extinguishing systems, but are not limited to that application. The plumbing fittings of the present invention also find application in any situations in which it is required that pressure losses in the fittings be minimized to the greatest possible extent. Typical of other such applications are transmission lines for crude oil, and any other fluid transmission lines in which a relatively high velocity flow of fluid is present, such, for example, as employed in the chemical processing industries.

Typically, plumbing elbows extend through 45° or 90° in the plane of their longitudinal axis, but, can be bends of any angular extent up to and exceeding 180°. Further, such elbows or bends do not necessarily have the longitudinal axis of the elbow or bend arranged in a single plane. The longitudinal axis of the elbow or bend can be arranged at an angle to the axis of the respective ends of the plumbing fitting to provide a double bend, in which the respective ends of the plumbing fitting are offset one from the other, the longitudinal axis of the elbow or bend then being curved or serpentine, and merging at its respective ends into the longitudinal axis of the associated end of the fitting.

For ease of discussion in this application, the longitudinal axis of the ends of the plumbing fitting are defined as lying in an X, Z plane common to both ends of the plumbing fitting, and, the longitudinal axis of curvature of the bend is defined as also lying in the X, Z plane. The inner radius of curvature of the elbow or bend, and which provides the intrados is defined as a RINT radius, and the outer curvature of the elbow or bend providing the extrados is defined as a REXT radius, each taken from points on the X—X axis, and each lying in the X, Z plane.

The Y—Y axis is defined as an axis perpendicular to the X, Z plane and which passes through the X—X axis. As more than one Y—Y axis is involved, Y—Y is employed to define an axis passing through the center of generation of a radius of the elbow or bend which lies on the general X, Z plane, and, YE—YE is used to define an axis perpendicular to the X, Z plane which passes through the longitudinal axis of curvature LAX of the elbow or bend.

It is emphasized that these definitions are employed for ease of discussion only, and, that within the general framework of definition, a myriad of variations are contemplated depending upon the specific configuration of the required elbow or bend, it being understand that the longitudinal axis of curvature of the elbow or bend may not necessarily be co-planar with the X, Z plane throughout the radius of the elbow or bend.

DISCUSSION OF THE PROBLEM

It has long been recognized that plumbing elbows or bends impose a substantial pressure loss and throttling action on fluids passing through pipelines incorporating such bends, particularly if the fluid is forced to pass through the pipe line at a substantial velocity.

Such pressure losses result in a reduction in volume per unit time for a standard pumping pressure, or, in the alternative require larger pumps with a concomitant increase in energy consumption if a specific volume per unit time of the pipeline is to be obtained at the downstream end of the pipeline.

This is of particular consequence in fire extinguishing systems that operate on line pressure. In the presence of pressure drops at the respective elbows or bends employed in the pipeline, those sprinklers closest to the line supply will encounter the highest pressure and deliver the highest volume of water, the pressure and volume progressively decreasing towards the downstream end of the pipeline.

Axially straight pipes themselves impose a pressure drop on fluid passing through those pipes, this being due mainly to skin friction between the inner wall of the pipe and the fluid passing through that pipe. Such pressure losses are unavoidable, but in fact are of little consequence as compared with the substantial pressure loss that occurs in the associated elbows and bends. In passing through an elbow or bend, not only does the transmitted fluid encounter the frictional skin effect, but also it encounters pressure losses due to centrifugal action produced by the change in direction of the fluid flow at the elbow or bend, and, more particularly, due to eddy currents that are produced in the fluid flow as it passes through the elbows or bends. Those eddy currents act with a throttling action on the fluid flow.

The smaller the radius of the elbow or bend, the greater will be the pressure losses produced in the elbow or bend. This dictates that for elbows or bends that produce minimal pressure losses, the radius of curvature of the bend or elbow must be relatively large. However, this imposes the disadvantage that if the radius of curvature of the elbow or bend is large, then, the resulting plumbing fitting also will be of increased size, with a consequential increase in manufacturing costs, and, the pipeline system itself becomes enlarged in dimensions and of reduced compactness.

BACKGROUND OF THE ART

In an attempt to minimize such pressure losses in elbows and bends it has been previously proposed to increase the transverse cross-sectional area of such elbows or bends at the radius of curvature. This, however, has resulted in an increase in turbulence in the fluid flow through such elbows or bends, and is self defeating in attempts to reduce pressure losses.

This is because an increase in radius at the extrados of the elbow or bend must be preceded and succeeded by a reduction in the radius of the extrados as it merges into the ends of the fitting. Thus, an attempted increase in the radius of the extrados in fact results in a reduction of the actual radius of the extrados, which in turn results in an increase in the skin friction and promotes the formation of eddy currents and separation effects in the downstream direction of fluid flow.

Typical in these respects is the disclosure to be found in White, U.S. Pat. No. 1,215,451, in which the radial extent of the extrados is increased, but, actual radius of curvature of the longitudinal axis of curvature remains unchanged.

Nordell U.S. Pat. No. 2,303,949 avoids this problem in White by arranging for the extrados to lie on the quadrant of a circle tangent to the pipe ends and parallel to the longitudinal axis, and, by an increase in the cross-sectional area of the elbow intermediate its ends by increasing the radius of curvature of the intrados. However, so doing results in the central longitudinal axis of the flow path being moved in a radially inward direction, i.e., it effects a decrease in the effective radius of the elbow with the disadvantages of increased turbulence and eddy currents in the fluid flow and an increase in the pressure losses.

This invention seeks to eliminate the disadvantage in White, by providing an extrados which is a quadrant of a circle tangent to the pipe ends, while at the same time eliminating the problem inherent in Nordell of movement of the central longitudinal axis of the elbow in a radially inward direction.

The present invention departs entirely from Nordell's teaching by causing the central longitudinal axis of the elbow to be positioned in a radially outward direction, thus providing an increase in the effective radius of the elbow, while at the same time providing for the formation of a compact elbow having a short center-to-end distance, in which the pressure drop is reduced to that of an elbow of considerably larger radius.

SUMMARY OF THE INVENTION

According to the present invention, a low pressure loss elbow or bend is provided by maintaining the extrados at the same radius as that of a conventional compact elbow or bend, and, by then displacing the centroid of the cross-sectional area of the radius of the elbow or bend in a radially outwards direction and towards the extrados by increasing the cross-sectional area of the elbow in directions lateral to the extrados, and in immediate proximity to the extrados.

A conceptual approximation of this concept is that of converting the cross-section at the bend into a triangle having its apex representing the intrados and its base representing the extrados, the centroid of the triangular cross-section being much closer to the base of the triangle, and being spaced furthest from the apex of the triangle. The formation of the cross-section as a triangular area, while theoretically being attractive, does not readily adapt itself to casting techniques. However, by modification of that concept it readily can be adapted to conventional casting techniques, as will now appear from the discussion of the accompanying drawings.

DESCRIPTION OF THE DRAWINGS

The invention will now be described with reference to the accompanying drawings, in which.

DESCRIPTION OF THE PRIOR ART

Figure 1:
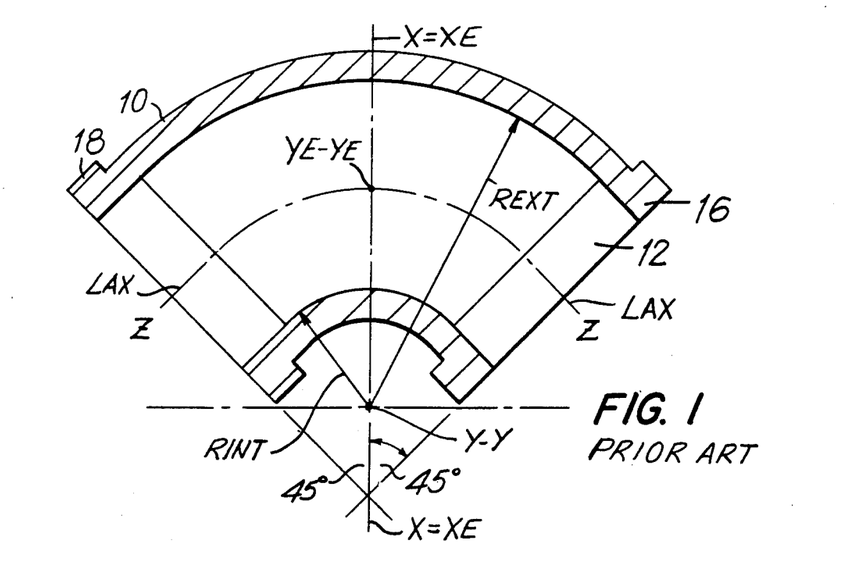
FIG. 1 is a longitudinal cross-section through a conventional prior art 90° elbow, and is identified as prior art.
Figures 2, 3:
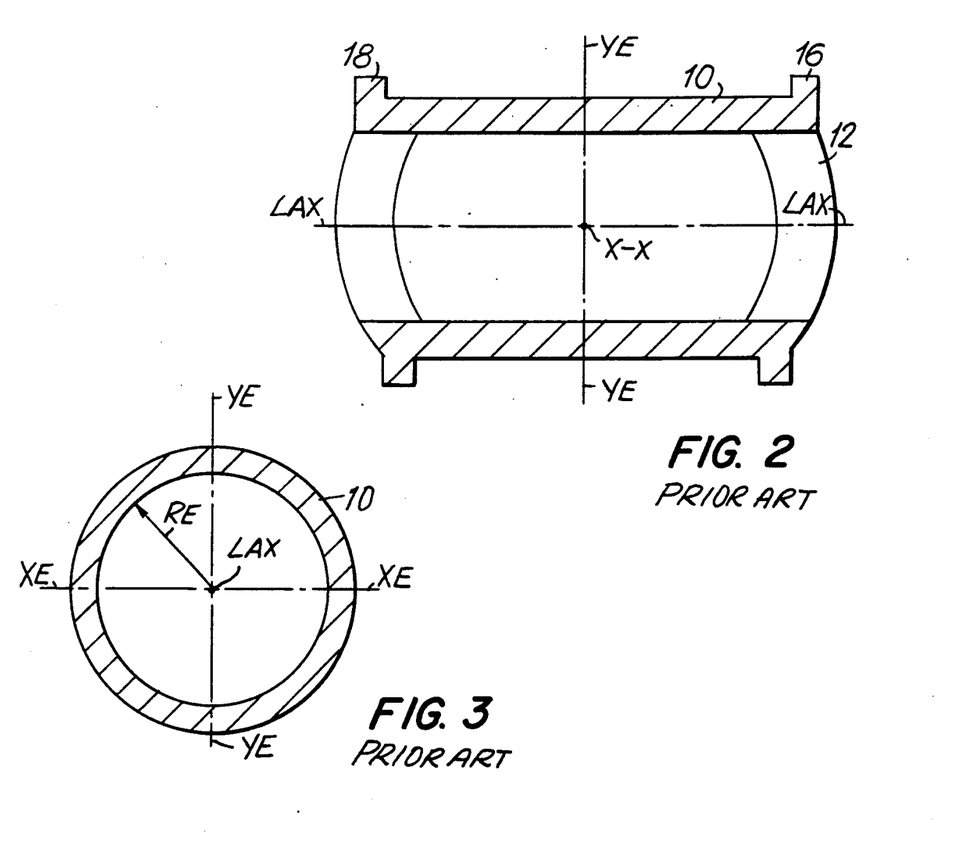
FIG. 2 is a longitudinal cross-section of the elbow of FIG. 1 taken along the longitudinal axis thereof, and is also identified as prior art.
FIG. 3 is a cross-section through the elbow of FIG. 1, taken on the line X—X of FIG. 1, and is also identified as prior art.

In order to illustrate the differences in the structure of the plumbing fitting of the present invention over known plumbing fittings, a discussion of such prior art fittings and the disadvantages thereof is now made with reference to FIGS. 1, 2 and 3 of the drawings.

FIG. 1 is a longitudinal cross-section of such a prior art plumbing fitting in the form of a 90° elbow, the longitudinal axis LAX of the plumbing fitting being positioned in an X, Z plane.

The fitting comprises an arcuate cylindrical portion 10, which extends symmetrically about the Y—Y axis, and, symmetrically to opposite sides of the X—Y plane. The arcuate cylindrical portion 10 terminates at its respective opposite ends in cylindrical portions 12 and 14. Any convenient manner of attaching the fitting to another fitting can be provided, these being illustrated in FIG. 1 as annular flanges 16, 18 provided at the opposite ends of the fitting.

In FIG. 1 the radially inner radius of curvature of the flow passage in the fitting, i.e., the intrados, is indicated by the radius RINT, that radius being a radius taken from the Y, Y axis. Also, the radially outer curvature of the flow passage in the fitting, or extrados, is indicated by the radius REXT, that radius also being taken from the Y—Y axis.

Referring now to FIGS. 2 and 3, which respectively are a longitudinal cross-section through the fitting taken on the center line LAX of the fitting, and a transverse cross-section taken in the X, Y plane, it will be clearly apparent that the fitting 10 is truly circular throughout its axial length, the flow conduit through the fitting being of constant radius RE. As illustrated in FIG. 2, the outer wall of the fitting is axially straight, and, as illustrated in FIG. 3, the cross-section of the outer wall is that of an annulus. The fact that the outer wall of the fitting is axially straight when viewed in cross-section along the LAX axis, and, the fact that the flow conduit is of constant radius at all points along the LAX axis dictates that the LAX axis is spaced equidistantly at all points along that axis from the inner wall of the fitting.

As will now be apparent, in view of the curved configuration of the fitting, more than one Y—Y axis is involved. Whereas the Y—Y axis provides the center of generation of the radii RINT and REXT, it does not provide the center of the radius RE of the flow conduit in the fitting. In order to distinguish between the respective Y—Y axis, that Y—Y axis that extends through the center of generation of the radius RE of the flow conduit is defined as YE—YE.

In the construction so far described, the radius of the elbow is constant in any radial plane that passes through the Y—Y axis, the radii RINT, REXT and RE each being constant throughout the entire arcuate angular extent of the elbow.

Such a construction carries with it the great advantage that it can be manufactured with ease and facility by conventional casting operations, the circular cross-section of the fitting allowing for ready parting of the molds in the X, Z plane after the casting operation. Further, a compact construction of fitting can be made with facility, and, a greater number of the respective fittings can be cast in a single casting mold of determined dimensions.

Figure 4:
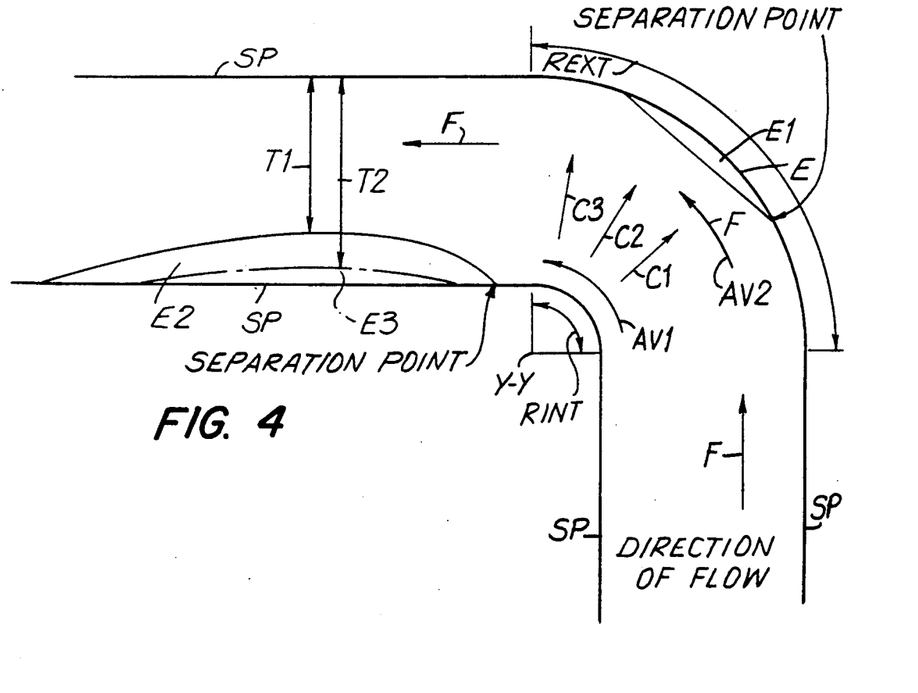
FIG. 4 is a schematic diagram illustrating the manner in which a 90° elbow influences the pressure losses arising in such an elbow.

It is a particular object of this invention to maintain the compactness of the fitting, thus permitting a greater number of fittings to be cast in a single operation, while at the same time minimizing to the largest possible extent the disadvantages in such "symmetrical" fittings, as is now discussed with respect to FIG. 4.

FIG. 4 diagrammatically illustrates the flow conditions that arise in the use of a conventional elbow.

In FIG. 4, the diagrammatic illustration is that of a conventional 90° elbow when incorporated into a pipeline comprised of an elbow E and straight lengths of pipe SP.

In FIG. 4, the direction of fluid flow through the pipeline is indicated by the arrows F. When approaching the elbow E, the fluid flow in the upstream straight pipe can be assumed as proceeding in a quiescent flow throughout the cross-section of the pipe in a linear direction, and entirely free of eddy currents. They will, of course, be minor eddy currents produced in the straight length of pipe by the skin friction of the straight pipe.

However, when encountering the 90° elbow E, these conditions change dramatically. Firstly, the fluid flow is caused to change direction through 90°, this giving rise to centrifugal forces which progressively escalate towards the opposite end of the elbow, as illustrated by the progressively escalating arrows C1, C2, C3. These centrifugal forces produce a reduction in the pressure in the fluid at the intrados RINT, and in turn, produces an increase in the pressure at the extrados REXT.

Secondly, the fluid flow is moving at maximum velocity at the intrados, and at minimum velocity at the extrados. As illustrated by the arrow AV1, the velocity at the intrados RINT will be considerably greater than at the extrados REXT, as illustrated by the arrow AV2. The higher velocity AV1 at the intrados RINT further increases the centrifugal forces acting on the fluid flow at the exit of the elbow, and further increases the pressure at the extrados REXT in that location, which is also the location in which the velocity AV2 of the fluid flow is the lowest.

This combination of conditions can result in backflow at the extrados, and, results in turbulence or eddy currents within the elbow, which act to throttle the fluid flow passing through the elbow, and which in turn produce a pressure drop in the elbow itself.

Even more importantly, the flow conditions arising in the elbow produce dramatic effects in the flow conditions in the downstream straight pipe, which are directly attributable to the flow conditions produced by the elbow itself. Due to the centrifugal effects occurring in the elbow, and the fact that the fluid flow AV2 at the extrados REXT is dragging behind the fluid flow AV1 at the intrados RINT in linear velocity, coupled with the drag produced by the eddy currents E1, a massive zone of eddy currents E2 occurs immediately downstream of the elbow E. This in turn produces a very substantial throttling action on the fluid flow, as indicated by the arrows T1, and in turn produces a very substantial pressure drop in the fluid flow.

It is an object of this invention to effect a very significant reduction in the eddy currents E2, in order to accomplish a greatly reduced throttling action, as indicated by the arrows T2, and in turn, to arrive at a significantly reduced pressure loss in the pipeline.

Figure 5:
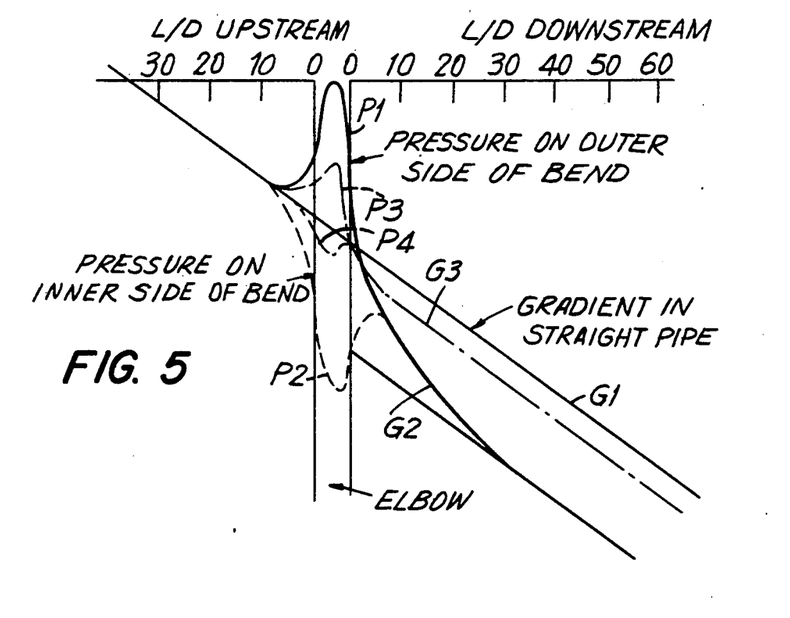
FIG. 5 is a graph illustrating the pressure losses in a 90° elbow, as related to the pressure losses in an axially straight pipe.

This objective is illustrated by the diagram of FIG. 5, in which the solid straight black line G1 is illustrative of the pressure drop gradient in an axially straight pipe; the solid black line G2 is illustrative of the pressure gradient in a pipeline incorporating a conventional 90° elbow; and, the solid black lines P1 and the dotted line P2 illustrate the pressure differentials that occur in the elbow itself. In contra distinction, the chain dotted lines P3 and P4 illustrate the pressure loss in an elbow or bend according to the present invention, the reduction in those pressure losses resulting in a substantial increase in the pressure gradient in the downstream straight pipe as indicated by the chain dotted line G3.

DESCRIPTION OF THE PREFERRED EMBODIMENTS

Figure 6:
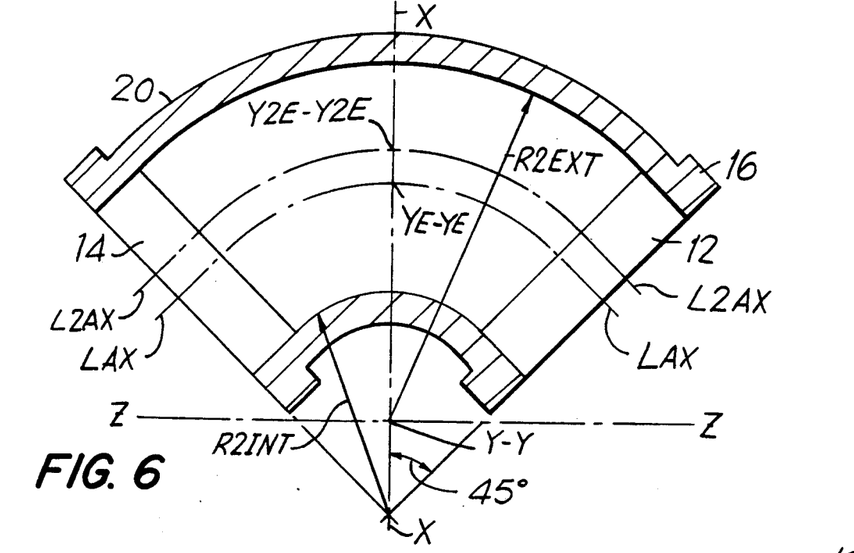
FIG. 6 is a longitudinal cross-section through a 90° elbow according to the present invention.

Referring now to FIG. 6, there is illustrated a plumbing fitting in the form of a 90° elbow according to the present invention.

As will be immediately apparent, when viewed in transverse cross-section, the elbow of FIG. 6 is closely similar to the longitudinal cross-section of the prior art elbow illustrated in FIG. 1.

In a total departure from the prior art teachings, instead of the longitudinal axis LAX of the flow path being moved towards the Y—Y axis to the L1AX position, according to the present invention it is instead moved radially outwards of the Y—Y axis to the position 2LAX, and this, without any increase in the radius R2EXT of the extrados of the bend. The center of the radius R2EXT remains on the Y—Y axis, the radus R2EXT thus being identical with the radius REXT of FIG. 1.

As has previously been discussed, any increase in the radius R2EXT would in turn result in an increase in the size of the fitting, in that it would require greater spacing of the cylindrical end portions 12 and 14, or, as taught by White in U.S. Pat. No. 125,451 would require movement of the center of the radius REXT radially outwardly from the Y—Y axis along the X—X axis, with the disadvantages attendant thereon that have been previously discussed.

As the radius R2EXT of the extrados can be no larger than the radius REXT of the extrados of the prior art if a compact elbow is to be provided, the problem now is how to move the LAX axis of the prior art in a radially outwards direction relative to the Y—Y axis to the position L2AX.

This is accomplished according to the present invention by making the cross-sectional area of the flow passage through the elbow in the form of an irregular ellipse, and by positioning in which the major axis of the ellipse radially outwardly with respect to the YE—YE axis, and into the position Y2E—Y2E.

By providing the major flow area in the vicinity of the extrados R2EX, minimization is obtained of the effects of the relative angular velocities AV1 and AV2, a lesser volume of the fluid flow then passing along the flow path of the arrow AV1 in FIG. 4, and an increased volume of the fluid then passing along the flow path AV2 in FIG. 4. This results in a greater equalization of the total angular flow velocity AV, and, in turn reduces eddy currents E1 in the elbow itself. Further, it significantly reduced eddy currents in the location E3 as discussed with respect to FIG. 4.

Figures 7, 8:
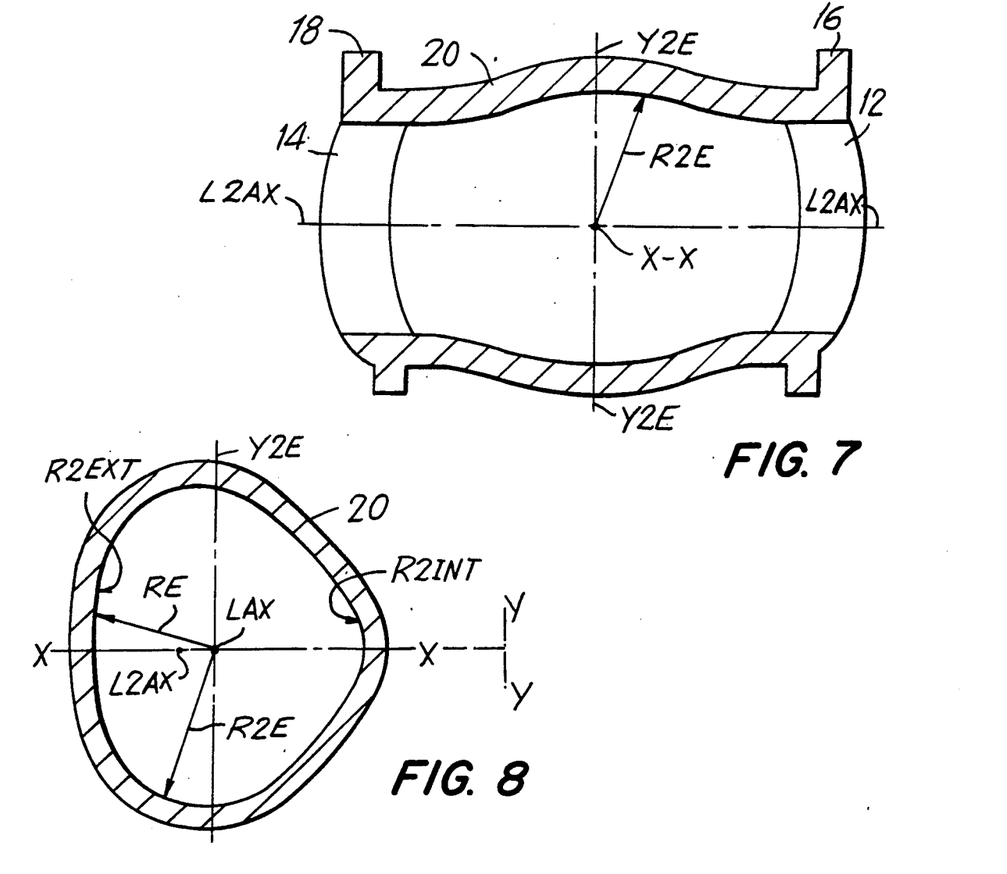
FIG. 7 is a longitudinal cross-section of the elbow of FIG. 6 taken on the axis L2AX of FIG. 6.
FIG. 8 is a transverse cross-section of the elbow of FIG. 6 taken on the X, Y plane of FIG. 6.

In contra distinction to the axially straight walls of the elbow as illustrated in FIG. 2, and as illustrated in FIGS. 7 and 8, the axial walls between the ends of the elbow then bow outwardly at a radius R2E which is greater than the radius RE of the extrados.

A cross-section of the elbow of FIG. 6 taken in the X, Y2E plane is illustrated in FIG. 8. As related to FIG. 3, FIG. 8 clearly illustrates an increase in the cross-sectional area of the flow path, and, also illustrates the manner in which the L2AX axis which defines the centroid of the irregular ellipse has been displaced radially outwardly of the Y—Y axis, and this without increasing the radius RE of the extrados of the physical size of the elbow.

Figure 9:
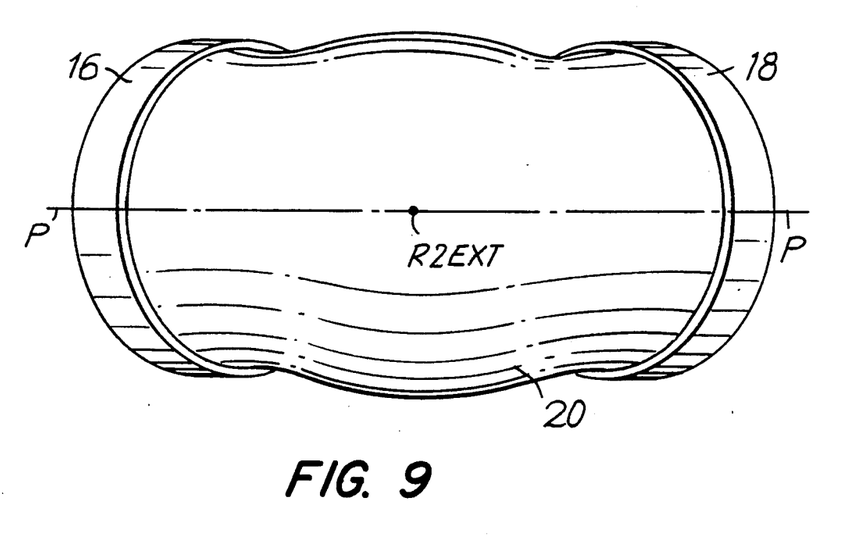
FIG. 9 is a front view of the elbow of FIG. 6.
Figure 10:
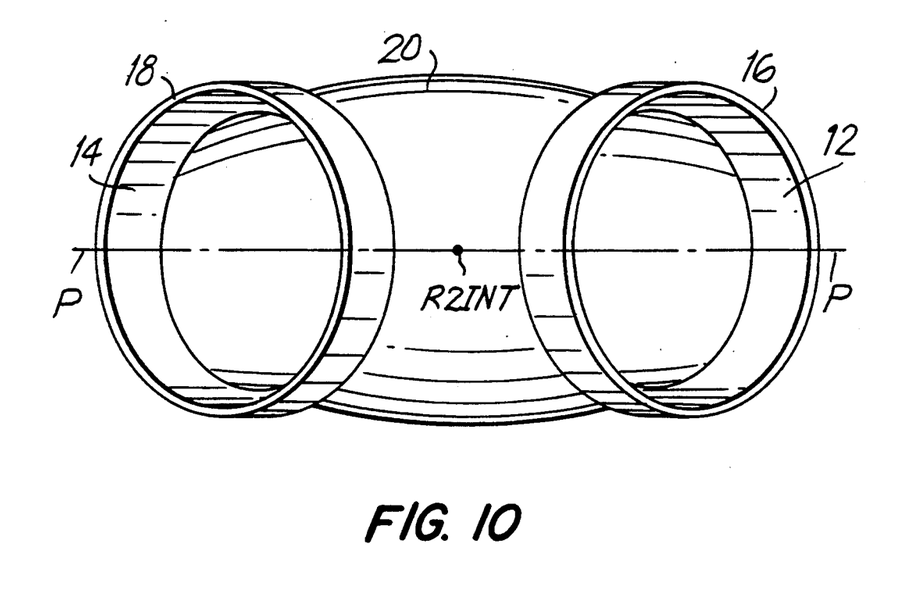
FIG. 10 is a rear view of the elbow of FIG. 6.

As illustrated in FIGS. 9 and 10, this will produce an outer configuration of the elbow, which, while closely simulating the configuration of a conventional elbow in plan form, exhibits outward bellying of the elbow at the curvature thereof when viewed in rear elevation as in FIG. 9, or in front elevation as in FIG. 10. However, this outward bellying of the elbow is of little consequence to the assembly of a pipeline incorporating such elbows, in that a minor increase in the height of the bend is of little consequence, whereas the provision of a tight or short radius bend can be of very significant consequence. Further, these advantages are obtained with only a minimal increase in the weight of the elbow without in any way requiring an increase in the dimensions between the ends of the elbows.

Figure 11:
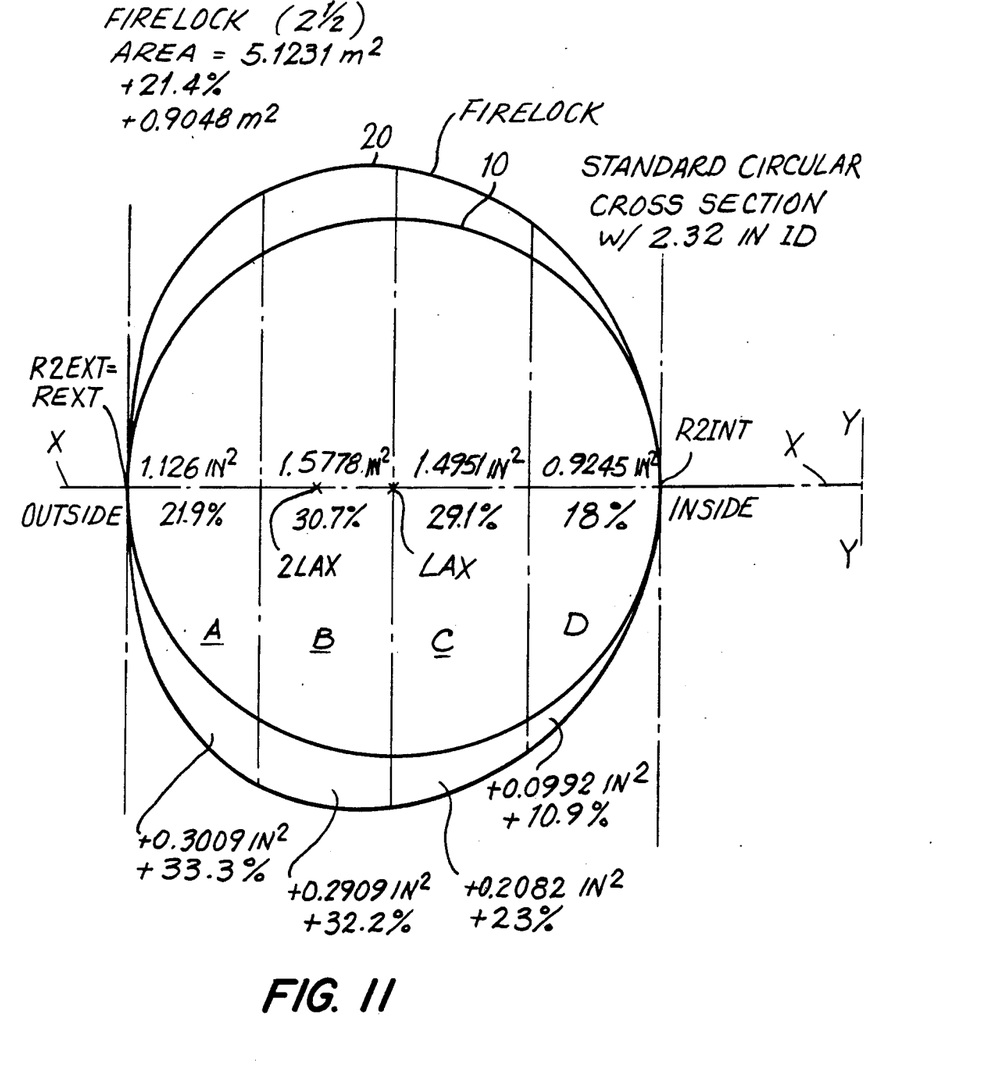
FIG. 11 is a diagram illustrating the manner in which the centroid of the cross-section can be shifted to a larger radius and towards the extrados of the elbow of FIG. 6.

The significance of shifting the longitudinal axis 2LAX radially outwardly of the longitudinal axis LAX as related to the Y—Y axis is now discussed with respect to FIG. 11, which diagrammatically illustrates the cross-sectional area of a conventional elbow 10, as compared with the cross-sectional area of an elbow 20 according to the present invention.

In FIG. 11, the respective cross-sectional areas are divided into four sectors A, B, C and D. In both constructions the radius of the extrados, REXT and R2EXT is of the same radius from the Y—Y axis. Also, the respective sectors are of identical width one with the other in the direction of the X—X axis.

As related to a conventional elbow in which A and D each represent 19.6% or the cross-sectional area, and B and C each represent 30.4% of the cross-sectional area, in the elbow of the present invention 21.9% of the cross-sectional area occurs in the sector A; 30.7% of the cross-sectional area occurs in the sector B; 29.1% of the cross-sectional area occurs in the sector C; and, 18% of the cross-sectional area occurs in the sector D, the sector D representing the smallest radius of curvature of the elbow and the one most proximate to the Y—Y axis.

According to the teachings of the present invention, the cross-sectional area in the sector A is increased from 21.9% to 33.3%; the cross-sectional area in the sector B is increased from 30.7% to 32.2%; the cross-sectional area in the sector C is decreased from 29.1% to 23%; and, the flow rate in the sector D is decreased from 18% to 10.9%.

Thus, according to the prior art teachings, only 50% of the cross-sectional area occurs in the sectors A and B. This is increased in accordance with the teachings of the present invention to a cross-sectional area of 65.5% in the sectors A and B.

As will be apparent, by arranging for the major volume of fluid flow to be along the outer curvature of the elbow, disparities between the angular velocity at the intrados and that at the extrados are minimized, the progressively escalating centrifugal forces also are minimized, and, the linearity of the fluid flow exiting the elbow or bend is maximized, this in turn providing minimization in the pressure losses in the pipeline.

While the invention has been described with respect to a 90° elbow, it is to be understood that elbows or bends of an angular extent other than 90° are contemplated, for example, 45° elbows, 135° bends and 180° bends, and elbows of bends of intermediate or larger angular extent. It is also to be understood that the invention contemplates elbows or bends in which the longitudinal axis L2AX lies other than in the X, Z plane, such as will be the case in a double elbow or offset bend in which the longitudinal axis of the respective ends of the bend lie in X, Y planes displaced one from the other. It further is to be understood that while the plumbing fitting of the present invention finds particular application in casting processes, it is not so limited in that respect, but can be formed at any convenient manner from a particular material selected for use in the intended application of that elbow or bend. Further, it is to be understood that the profile and cross-sectional area of the elbow as illustrated in FIG. 11 is to be considered as an example only of a profile and cross-sectional area having utility as a preferred embodiment. Other profiles of transverse cross-section up to and including a triangle having its apex positioned on the X—X axis and extending towards the Y—Y axis and having its base providing the extrados also are included in the scope of the apended claims, those profiles of transverse cross-section having the effect of shifting the longitudinal axis 2LAX radially outwardly towards the extrados and radially away from the Y—Y axis.

I claim:

1. A plumbing fitting having an outer wall defining a tubular arcuate fluid flow path, said outer wall including a first arcuate wall portion providing an extrados of said arcuate fluid flow path, said extrados lying on a first radius taken from a first point located on an axis Y—Y that extends perpendicular to the X, Z plane of the fitting, said first point and said Y—Y axis each being positioned externally of said fitting, and a second arcuate wall portion positioned radially inwardly of said first wall portion and which provides an intrados of said fluid flow path, said second arcuate wall portion having a radius greater than a radius taken from said first point and which is taken from a point located on an X—X axis that intersects said Y—Y axis at said first point on said Y—Y axis, further including:

third and fourth wall portions each providing a curved transition between said extrados provided by said first wall portion and said intrados provided by said second wall portion;

said third and fourth wall portions each being configured in radial planes that include and extend perpendicular to said Y—Y axis to define a cross-sectional area of said flow path having a centroid positioned further from said first point on said Y—Y axis than is a center positioned equidistantly between said extrados and said intrados.

2. The plumbing fitting of claim 1, in which said cross-sectional area is in the form of an ellipsoid having a major axis extending transversely of an X—X axis that includes said first point, and a minor axis extending in the direction of said X—X axis, said centroid of said ellipsoid being positioned in proximity to said extrados and remotely from said intrados.

3. The plumbing fitting of claim 2, in which said major axis extends perpendicular to said X—X axis.

4. The fitting of claim 3, in which said minor axis is coincident with said X—X axis.

5. The plumbing fitting of claim 4, in which said ellipsoid is symmetrical on opposite sides of said X—X axis.

6. The plumbing fitting of claim 2, when incorporated into a pipeline including axially straight pipes.

7. A pipeline comprised of at least two axially straight pipes, and a plumbing fitting of claim 2 interconnecting said pipes.

8. The plumbing fitting of claim 1, in which said centroid is positioned on an X—X axis that includes said first point.

9. The fitting of claim 8, in which said ellipsoid has an area greater than the area of a circle having a diameter defined by said extrados and said intrados.

10. The fitting of claim 9, in which greater than 50% of said cross-sectional area is located radially outwardly of the center of said circle in the direction of an X—X axis defined by said radius.

11. The fitting of claim 1, in which said extrados lies on the minor axis of an ellipsoid having its centroid positioned on an X—X axis that includes said first point, the major axis of said ellipsoid extending transversely of said X—X axis.

12. The plumbing fitting of claim 1, when incorporated into a pipeline including axially straight pipes.

13. A pipeline comprised of at least two axially straight pipes, and a plumbing fitting of claim 1 interconnecting said pipes.

* * * * *